United States Patent
Liu et al.

(10) Patent No.: US 11,770,837 B2
(45) Date of Patent: *Sep. 26, 2023

(54) SYSTEMS AND METHODS FOR DETERMINING INFORMATION INDICATIVE OF CANCELATION

(71) Applicant: ZTE CORPORATION, Guangdong (CN)

(72) Inventors: Xing Liu, Shenzhen (CN); Peng Hao, Shenzhen (CN); Kai Xiao, Shenzhen (CN); Xianghui Han, Shenzhen (CN)

(73) Assignee: ZTE Corporation, Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/682,877

(22) Filed: Feb. 28, 2022

(65) Prior Publication Data

US 2022/0182990 A1 Jun. 9, 2022

Related U.S. Application Data

(63) Continuation of application No. 17/214,219, filed on Mar. 26, 2021, now Pat. No. 11,265,870, which is a
(Continued)

(51) Int. Cl.
*H04W 72/04* (2023.01)
*H04W 72/23* (2023.01)
*H04W 72/0446* (2023.01)

(52) U.S. Cl.
CPC ....... *H04W 72/23* (2023.01); *H04W 72/0446* (2013.01)

(58) Field of Classification Search
CPC .................. H04W 72/042; H04W 72/0446
See application file for complete search history.

(56) References Cited

U.S. PATENT DOCUMENTS

| 10,856,317 | B2 | 12/2020 | Ma et al. |
| 11,363,609 | B2 | 6/2022 | Shi et al. |

(Continued)

FOREIGN PATENT DOCUMENTS

| CN | 109600211 A | 4/2019 |
| CN | 110351834 A | 10/2019 |

(Continued)

OTHER PUBLICATIONS

Anonymous, "3rd Generation Partnership Project; Technical Specification Group Radio Access Network; NR; Physical layer procedures for control (Release 16)" 3GPP TS 38.213 V16.0.0, Dec. 2019, Sophia Antipolis, Valbonne, France (146 pages).

(Continued)

*Primary Examiner* — Zhiren Qin
(74) *Attorney, Agent, or Firm* — Foley & Lardner LLP

(57) ABSTRACT

Systems and methods for wireless communications are disclosed herein. In one embodiment, a base station configures a first uplink resource. The first uplink resource is defined using configuration parameters including at least one of a time-domain starting point of the first uplink resource, a time-domain duration of the first uplink resource, or a frequency-domain range of the first uplink resource. The base station transmits to a wireless communication device an indication that uplink transmission on a second uplink resource within the first uplink resource is canceled. The wireless communication device cancels the uplink transmission on the second uplink resource.

12 Claims, 9 Drawing Sheets

Related U.S. Application Data continuation of application No. PCT/CN2019/130269, filed on Dec. 31, 2019.

(56) References Cited

U.S. PATENT DOCUMENTS

| | | | |
|---|---|---|---|
| 2012/0208583 | A1 | 8/2012 | Chung et al. |
| 2017/0373802 | A1 | 12/2017 | Bergstrom et al. |
| 2019/0158334 | A1 | 5/2019 | Kim et al. |
| 2019/0246432 | A1 | 8/2019 | Hosseini et al. |
| 2019/0254081 | A1* | 8/2019 | Li ............... H04W 72/0446 |
| 2019/0342888 | A1 | 11/2019 | Hosseini et al. |
| 2019/0349927 | A1 | 11/2019 | Qin et al. |
| 2019/0356446 | A1 | 11/2019 | Kim et al. |
| 2020/0008189 | A1 | 1/2020 | Yin et al. |
| 2020/0015261 | A1 | 1/2020 | Takeda et al. |
| 2020/0022094 | A1 | 1/2020 | You et al. |
| 2020/0154415 | A1 | 5/2020 | Oh et al. |
| 2020/0154496 | A1 | 5/2020 | Yi |
| 2020/0236699 | A1 | 7/2020 | Nakashima et al. |
| 2020/0260495 | A1 | 8/2020 | Kim et al. |
| 2020/0280984 | A1 | 9/2020 | Yi |
| 2020/0322971 | A1 | 10/2020 | Jung et al. |
| 2020/0344034 | A1 | 10/2020 | Moon et al. |
| 2020/0383144 | A1 | 12/2020 | Sun et al. |
| 2021/0007119 | A1 | 1/2021 | Li et al. |
| 2021/0014866 | A1* | 1/2021 | Shi ............... H04W 80/08 |
| 2021/0045042 | A1 | 2/2021 | Nakashima et al. |
| 2021/0092752 | A1 | 3/2021 | Taneja et al. |
| 2021/0120522 | A1 | 4/2021 | Kim et al. |
| 2021/0144708 | A1* | 5/2021 | Wang ............... H04W 72/0453 |
| 2021/0168858 | A1 | 6/2021 | Liu et al. |

FOREIGN PATENT DOCUMENTS

| | | |
|---|---|---|
| CN | 110366246 A | 10/2019 |
| CN | 112583550 A | 3/2021 |
| WO | WO-2019/160332 A1 | 8/2019 |
| WO | WO-2019/184688 A1 | 10/2019 |

OTHER PUBLICATIONS

Vivo, "Summary#1 of UL inter UE Tx prioritization/multiplexing" 3GPP TSG RAN WG1 #98, R1-1909460, Aug. 30, 2019, Prague, CZ (39 pages).

Wilus Inc., "Remaining Issues on UL cancellation scheme for NR URLLC" 3GPP TSG RAN WG1 #99, R1- 1913070, Nov. 22, 2019, Reno, USA (6 pages).

Nokia et al., "Remaining details on NR-U uplink signals and channels" 3GPP TSG RAN WG1 #99, R1-1912259, Nov. 22, 2019, Reno, USA (16 pages).

Second Office Action for CN Appl. 2022100027827, dated Sep. 29, 2022 (with English translation, 27 pages).

Asia Pacific Telecom, "Considerations on UL inter-UE prioritization and multiplexing" 3GPP TSG-RAN WG1 Meeting #99, R1-1912254, Nov. 22, 2019, Reno, USA (6 pages).

Extended European Search Report for EP Appl. No. 19952781.3, dated Jan. 27, 2022 (10 pages).

International Search Report and Written Opinion for PCT Appl. No. PCT/CN2019/130269 dated Sep. 29, 2020 (8 pages).

International Search Report and Written Opinion for PCT Appl. No. PCT/CN2019/130270 dated Sep. 25, 2020 (8 pages).

LG Electronics, "Discussion on UL inter UE Tx prioritization" 3GPP TSG RAN WG1 #99, R1-1912400, Nov. 22, 2019, Reno, USA (7 pages).

Non-Final Office Action for U.S. Appl. No. 17/214,219, dated Jun. 30, 2021 (15 pages).

Samsung: "Introduction of Ultra Reliable, Low Latency Communications Enhancements" 3GPP TSG-RAN WGI Meeting #99 RI-1913649 Dec. 6, 2019(Dec. 6, 2019)Reno, USA (46 pages).

Sony: "Remaining issues in UL Inter UE transmission prioritisation & multiplexing" 3GPP TSG RAN WGI #99 RI-1912354 Nov. 22, 2019(Nov. 22, 2019) Reno, USA (8 pages).

U.S. Notice of Allowance on U.S. Appl. No. 17/214,219 dated Oct. 22, 2021.

Vivo: "UL inter-UE Tx prioritization for URLLC" 3GPP TSG RAN WGI #99 RI-1912034 Nov. 22, 2019(Nov. 22, 2019) Reno, Nevada (10 pages).

Wilus Inc.: "Remaining Issues on UL cancellation scheme for NR URLLC" 3GPP TSG RAN WGI #99 RI-1913070 Nov. 22, 2019(Nov. 22, 2019)Reno, USA (6 pages).

ZTE: "UL inter-UE multiplexing between eMBB and URLLC" 3GPP TSG RAN WG I #96bis R1-1904147 Apr. 12, 2019(Apr. 12, 2019) Xi'an, China (13 pages).

* cited by examiner

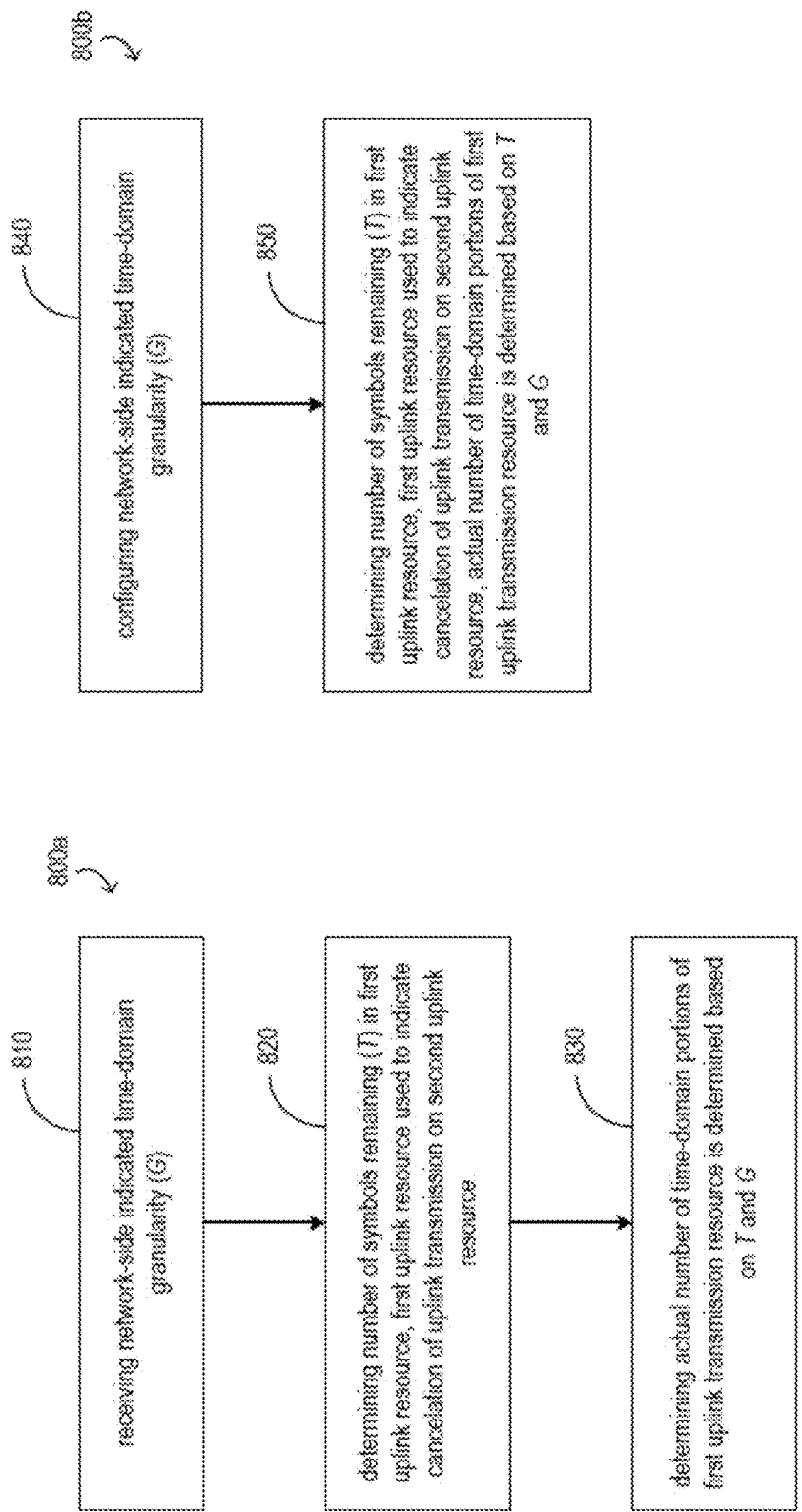

SYSTEMS AND METHODS FOR DETERMINING INFORMATION INDICATIVE OF CANCELATION

CROSS-REFERENCE TO RELATED APPLICATIONS

The present application claims the benefit of priority under 35 U.S.C. § 120 as a continuation of U.S. patent application Ser. No. 17/214,219, filed Mar. 26, 2021, which claims the benefit of priority under 35 U.S.C. § 120 as a continuation of PCT Patent Application No. PCT/CN2019/130269, filed on Dec. 31, 2019, each of which is incorporated herein by reference in its entirety for all purposes.

TECHNICAL FIELD

The present disclosure relates to the field of telecommunications, and in particular, to detecting information indicative of preemption of transmission resources.

BACKGROUND

Demands for the 5th Generation Mobile Communication Technology (5G) are increasing at a rapid pace. Developments are taking place to provide enhanced mobile broadband, ultra-high reliability, ultra-low-latency transmission, and massive connectivity in 5G systems.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In some embodiments, a base station configures a first uplink resource, the first uplink resource being defined using configuration parameters including at least one of a time-domain starting point of the first uplink resource, a time-domain duration of the first uplink resource, or a frequency-domain range of the first uplink resource. The base station transmits to a wireless communication device an indication that uplink transmission on a second uplink resource within the first uplink resource is canceled. The wireless communication device cancels the uplink transmission on the second uplink resource.

In some embodiments, a wireless communication device receives from a base station an indication that uplink transmission on a second uplink resource within a first uplink resource is canceled. The first uplink resource is defined using configuration parameters including at least one of a time-domain starting point of the first uplink resource, a time-domain duration of the first uplink resource, or a frequency-domain range of the first uplink resource. The wireless communication device cancels the uplink transmission on the second uplink resource.

In some embodiments, a wireless communication device receives from a base station a network-side indicated time-domain granularity (G) and determines a number of symbols remaining (T) in a first uplink resource. The first uplink resource is used to indicate cancelation of uplink transmission on a second uplink resource. The wireless communication device determines a number of time-domain portions of the first uplink transmission resource based on T and G.

In some embodiments, a base station configures a network-side indicated time-domain granularity (G) and determines a number of symbols remaining (T) in a first uplink resource. The first uplink resource used to indicate cancelation of uplink transmission on a second uplink resource. An actual number of time-domain portions of the first uplink transmission resource is determined based on T and G.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 8A is a schematic diagram illustrating a method for indicating preemption of uplink transmission resources within a RUR, in accordance with some embodiments of the present disclosure.

FIG. 8B is a schematic diagram illustrating a method for indicating preemption of uplink transmission resources within a RUR, in accordance with some embodiments of the present disclosure.

DETAILED DESCRIPTION

Figure 1:
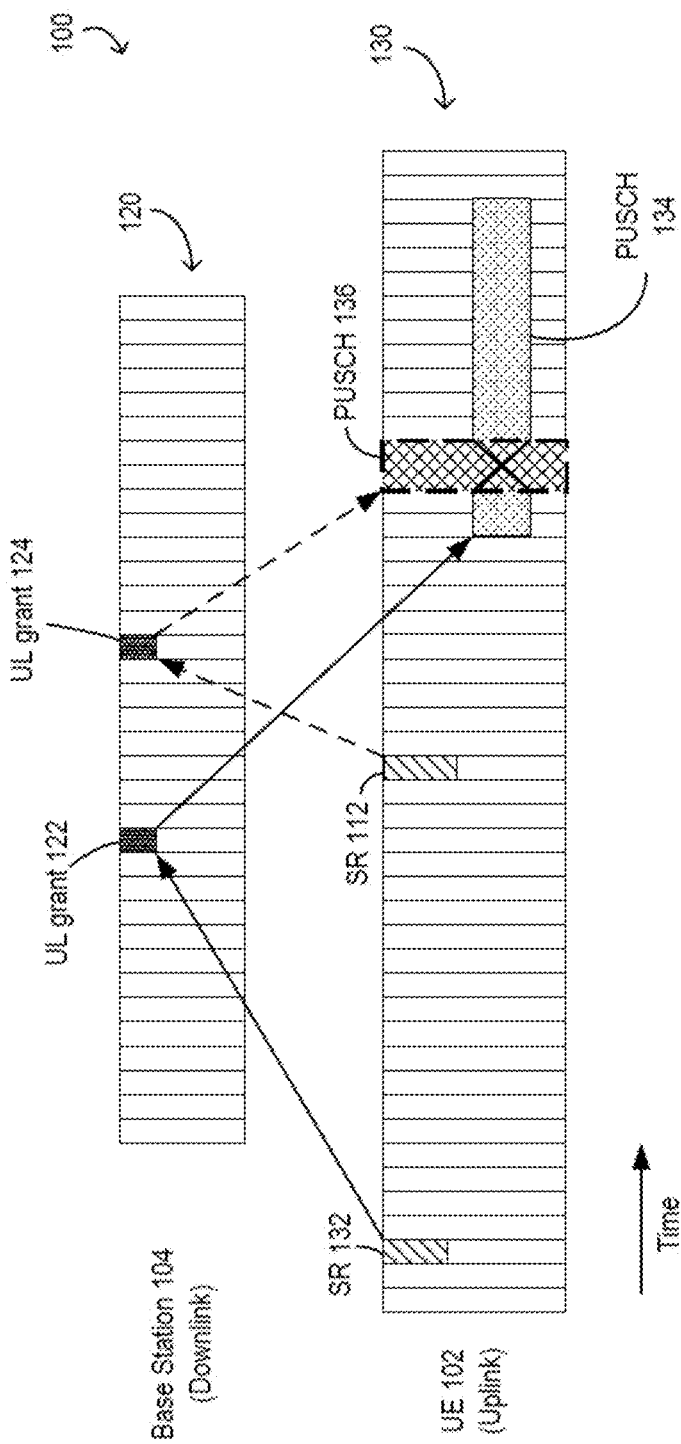
FIG. 1 is a schematic diagram illustrating physical uplink shared channel (PUSCH) resource being preempted, in accordance with some embodiments of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Developments in 5G wireless communication systems are directed to achieving higher data communicate rate (e.g., in Gbps), massive number of communication links (e.g., 1 M/Km$^2$), ultra-low latency (e.g., under 1 ms), higher reliability, and improved energy efficiency (e.g., at least 100 times more efficient than previous systems). To achieve such improvements, in wireless communication systems under the 5G standard, different types of services are configured with different priority levels according to different needs for and tolerance to latency, reliability, energy efficiency, and so on. For example, different types of uplink services with different transmission delay reliability requirements and different priority channels for the same service can be transmitted.

When different services having different priority levels are transmitted within a same cell, to provide transmission capabilities of high-priority services, transmission resources for low-priority services may be preempted by high-priority services, and the transmission of the low-priority services using those preempted transmission resources are canceled. Such mechanism avoids collisions between the low-priority services and the high-priority services in transmitting using the same transmission resources. In some cases, a first service with one or more of a higher priority level, higher reliability, or shorter transmission time can preempt transmission resources for a second service with one or more of a lower priority level, lower reliability, or longer transmission time.

To minimize the performance impact, preemption indication information needs to be conveyed to the UE that has its transmission resources preempted. The preempted transmission resources can be referred to as "canceled transmission resources." The preemption indication information can be referred to as "cancelation indication information."

Currently, with respect to downlink transmission resource preemption (e.g., downlink service cancelation), a base station (e.g., BS, gNB, eNB, and so on) uses downlink control information (DCI) to indicate the preempted resources in a reference downlink resource (RDR). In particular, configured RDR is partitioned into 14 blocks by the base station, for example, using {M, N}={14, 1} or {7, 2}. A bitmap maps bits (indicative of preemption status) unto the blocks. The bitmap is used to indicate whether each of the blocks is preempted. M represents a number of partitions of the RDR in the time domain. N represents a number of partitions of the RDR in the frequency domain. When preemption occurs, the base station can send a downlink preemption indication (DL PI) at a specific monitoring occasion after the end of the preemptive downlink transmission. The DL PI is a type of "after-the-fact" indication. The UE further completes the reception of the downlink transmission. The UE monitors the DL PI after receiving the downlink transmission to determine whether the previous downlink transmission is preempted and processes the downlink data in response to determining that the downlink transmission has not been preempted.

With respect to uplink transmission resource preemption (e.g., uplink service cancelation), a similar indication such as but not limited to, uplink cancelation indication (UL CI), can be defined for uplink time-frequency domain resources. In contract to the DL PI, in order to prevent uplink transmission of the UE, the UE needs to be notified of the preemption via a UL CI before transmission of the uplink service. Based on such uplink cancelation indication, uplink transmissions of services that have a relatively low priority level can accordingly be canceled (if not yet transmitted) or stopped (while being transmitted), thus avoiding performance degradation resulting from simultaneously transmitting both types of services using the same uplink transmission resource. The embodiments described herein relate to the manner in which the network side indicates or signals uplink transmission resource preemption or uplink service cancelation.

FIG. 1 is a schematic diagram illustrating a process 100 by which a PUSCH uplink transmission resource is preempted, in accordance with some embodiments of the present disclosure. Referring to FIG. 1, the process 100 involves a UE 102 and a base station 104 (e.g., a BS, gNB, eNB, and so on). An uplink transmission diagram 130 illustrates uplink activities for the UE 102. A downlink transmission diagram 120 illustrates downlink activities of the base station 104. The diagrams 120 and 130 show slots divided in the time domain (denoted by the horizontal axis). In some examples, the dimension or axis of each of the diagrams 120 and 130 that is perpendicular to the time domain axis represents frequency such as but not limited to, a bandwidth, an active uplink bandwidth part (BWP), and so on. Frequency is discontinuous across the different diagrams 120 and 130.

The UE 102 sends a scheduling request (SR) 132 to the base station 104 in uplink. The SR 132 requests the base station 104 for uplink transmission resource for uplink service referred to as a first uplink service. Examples of the first uplink service include but are not limited to, an enhanced mobile broadband (eMBB) service. The base station 104 allocates a first uplink transmission resource (e.g., a PUSCH 134) for the UE 102 via uplink grant (UL grant) 122. The base station 104 sends the UL grant 122 to the UE 102 in downlink to notify the UE 102 that the UE 102 can transmit the first uplink service using the PUSCH 134.

After the UE 102 sends the SR 132 to the base station 104, and after the base station 104 sends the UL grant 122 to the UE 102, the UE 102 sends an SR 112 to the base station 104. The SR 132 requests the base station 104 for uplink transmission resource for uplink service referred to as a second uplink service. Examples of the second uplink service include but are not limited to, an ultra-reliable low latency communications (URLLC) service.

Given that the second uplink service (e.g., the URLLC service) of the UE 106 has ultra-high reliability and ultra-low-latency transmission requirements, the base station 104 allocates uplink transmission resource that is as early in time as possible. The base station 104 determines that a second uplink transmission resource (e.g., a PUSCH 136) that satisfies the ultra-high reliability and ultra-low-latency transmission requirements may have already been allocated to the UE 102. That is, the base station 104 determines that at least a portion of the PUSCH 134 collides (e.g., overlaps in time) with at least a portion of the PUSCH 136. In response to determining that the priority level of the second uplink service (e.g., the URLLC service) of the UE 106 is higher than the priority level of the first uplink service (e.g., the eMBB service) of the UE 102, the base station 104 cancels the transmission of the first uplink service on the previously allocated uplink transmission resource (e.g., the PUSCH 134). The UE 102 can cancel or continue transmission of the first uplink service in a remainder of the PUSCH 134 (e.g., the portion of the PUSCH 134 that is after the PUSCH 136).

The low-priority uplink transmission can be canceled using various methods. In one example, the base station 104 reschedules a new uplink transmission resource (not shown) for the UE 102 and then cancels the uplink transmission on the originally allocated uplink transmission resource (e.g., the PUSCH 134). The base station 104 can retransmit the uplink grant (retransmission not shown) to the UE 102 to notify the UE 102 that the UE 102 can transmit the first uplink service using the new PUSCH (e.g., the transmission is rescheduled to another uplink transmission resource PUSCH). A new data indicator (NDI) field of the new uplink grant is toggled, thus indicating that the new uplink grant corresponds to the first uplink service (e.g., the eMBB service). In some examples, the entire originally allocated uplink transmission resource (e.g., the PUSCH 134) or a portion thereof can be rescheduled and released using such method. Also, an entire transport block (TB) or a portion thereof can be transmitted using the new uplink transmission resource.

In another example, the base station 104 can notify the UE 102 that the originally allocated uplink transmission resource (e.g., the PUSCH 134) is preempted by the high-priority service transmission using cancelation indication signaling (e.g., the UL CI). Accordingly, the UE 102 cancels the transmission on the preempted resource (e.g., the PUSCH 134) in response to receiving the cancelation indication signaling. The cancelation indication signaling can be carried in the physical DCI on the downlink control channel or another specific signal sequence.

In yet another example, the base station 104 can instruct the UE 102 to reduce transmission power to zero on the entire originally allocated uplink transmission resources (e.g., the PUSCH 134) or a portion thereof, to indirectly cancel the transmission of the first uplink service on the entire originally allocated uplink transmission resource (e.g., the PUSCH 134) or a portion thereof, respectively. Accordingly, in response to receiving transmission power reduction commands/signals from the base station 104, the UE 102 cancels transmission on the entire originally allocated uplink transmission resource (e.g., the PUSCH 134) or a portion thereof.

The cancelation of the first uplink service caused by the collision with the high-priority second uplink service described with reference to the process 100 is an illustrative example of a scenario applicable to the present embodiments, and additional scenarios in which an uplink service is canceled can be caused by other suitable reasons and are likewise applicable to the present embodiments. Examples of such additional scenarios include but are not limited to, an uplink service being canceled due to conflicts with frame structure configuration, an uplink service being canceled due to collisions with other uplink transmissions of the same UE or different UEs, an uplink service being canceled due to power limitations of the 102, and so on.

In some embodiments, the PUSCH (e.g., the PUSCH 134) is an example of uplink transmission resources capable of carrying data for both low-priority services and high-priority services. A scheme similar to the scheme for canceling the first uplink transmission on the PUSCH 134 can be implemented for canceling one or more other types of uplink transmissions with lower priority such as but not limited to, those uplink transmissions on a physical uplink control channel (PUCCH), Sounding Reference Signal (SRS), Physical Random Access Channel (PRACH), and so on, due to preemption in favor of one or more other types of uplink transmissions with higher priority. While the second uplink service transmitted using the PUSCH 136 is illustrated as an example of high-priority uplink services that can cause the cancelation of low-priority uplink services, transmissions of other types of high-priority uplink services (e.g., uplink transmissions communicated on the PUCCH, SRS, PRACH, and so on) can likewise cause the cancelation of low-priority uplink services.

Figure 2:
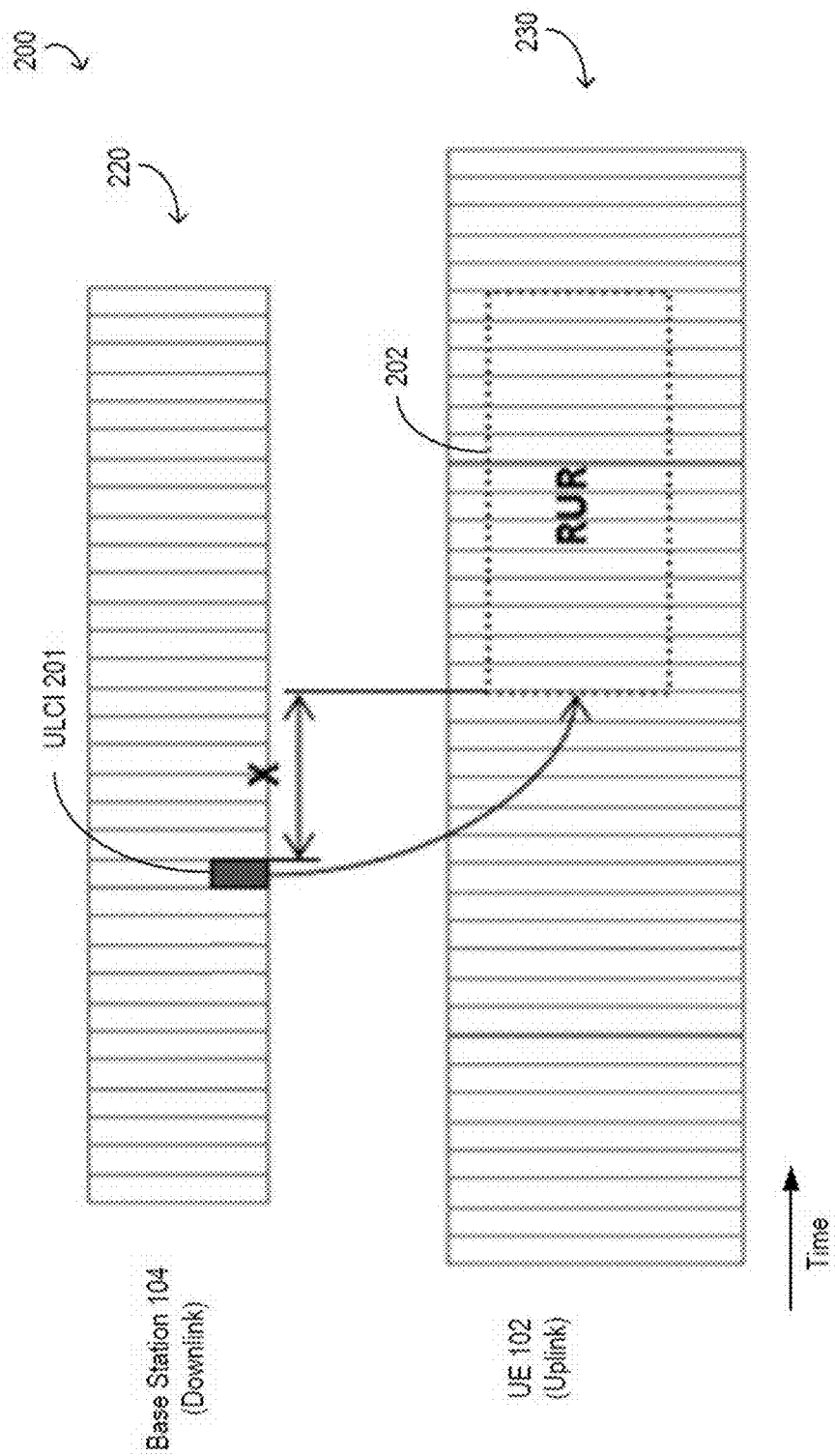
FIG. 2 is a schematic diagram illustrating a process for canceling uplink transmissions, in accordance with some embodiments of the present disclosure.

FIG. 2 is a schematic diagram illustrating a process 200 for canceling uplink transmissions, in accordance with some embodiments of the present disclosure. Referring to FIGS. 1 and 2, the process 200 involves the UE 102 and the base station 104. An uplink transmission diagram 230 illustrates uplink activities for the UE 102. A downlink transmission diagram 220 illustrates downlink activities of the base station 104. The diagrams 220 and 230 show slots divided in the time domain (denoted by the horizontal axis). In some examples, the dimension or axis of each of the diagrams 220 and 230 that is perpendicular to the time domain axis represents frequency such as but not limited to, a bandwidth, an active uplink BWP, and so on. Frequency is discontinuous across the different diagrams 220 and 230.

In some embodiments, the base station 104 can send an UL CI 201 in the downlink to the UE 102. The UL CI 201 corresponds to cancelation of uplink transmission in an uplink transmission resource within a reference uplink time-frequency resource region such as but not limited to, an RUR 202. In particular, the UL CI 201 is used to indicate or otherwise identify cancelation of transmission of an uplink service carried on an uplink resource (e.g., the PUSCH 134) within the RUR 202 corresponding to the UL CI 201.

In some embodiments, the RUR 202 can be divided into time-frequency resource sub-blocks. Each bit in the DCI corresponds to a time-frequency resource sub-block. A bit value being a first value (e.g., 1) indicates that a time-frequency resource sub-block corresponding to the bit is a canceled resource (e.g., uplink transmission on that time-frequency resource sub-block is canceled). The bit value being a second value (e.g., 0) indicates that a time-frequency resource sub-block corresponding to the bit is not a canceled resource (e.g., uplink transmission on that time-frequency resource sub-block is not canceled).

Figure 3:
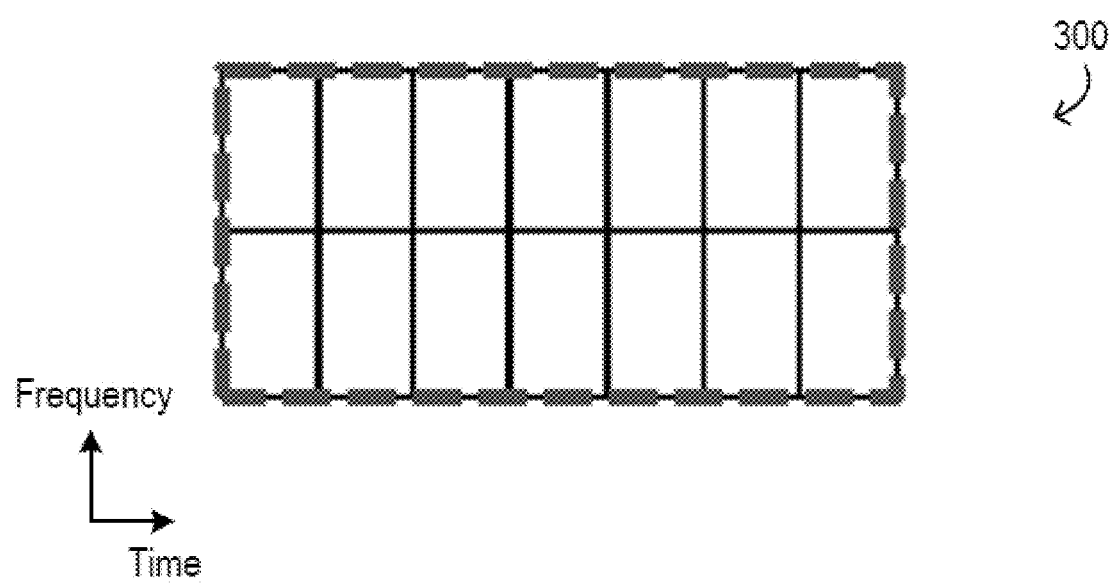
FIG. 3 is a schematic diagram illustrating an example uplink resource region (RUR), in accordance with some embodiments of the present disclosure.

In that regard, FIG. 3 is a schematic diagram illustrating an example RUR 300, in accordance with some embodiments of the present disclosure. Referring to FIGS. 1-3, the RUR 300 is an example of the RUR 202. The RUR 300 is shown as a rectangle defined by dashed lines. The network side divides the entire RUR 300 into seven portions in the time domain and two portions in the frequency domain. Accordingly, the RUR 300 includes a total of 14 time-frequency resource sub-blocks. That is, the RUR 300 corresponds to a time-domain granularity parameter of seven (e.g., timeGranularityforCI=7) and an indication overhead parameter of 14 (e.g., CI-PayloadSize=14 bits). The time-domain granularity parameter is used to indicate that the RUR 300 is divided into seven time-domain portions in the time domain. The indication overhead is used to indicate that 14 bits are used to signal canceled resources in the RUR 300. Based on the time-domain granularity parameter and the indication overhead parameter, it can be determined that each of the seven time-domain portions is further divided into two frequency-domain portions. The bit value in the DCI that corresponds to the time-frequency resource sub-block and time-frequency resource sub-block thereof is the first value (e.g., 1), indicating that the transmission of the first uplink service carried on the PUSCH 134 in the corresponding time-frequency resource sub-block is canceled.

Downlink symbols and symbols configured to receive Synchronization Signal Block (SSB) cannot be scheduled for uplink transmission. In order to avoid invalid indications, symbols configured as semi-static downlink symbols and symbols indicated as SSB or synchronization signal physical broadcast channel block (SS/PBCH block) need to be excluded from the RUR. That is, the symbols configured as semi-static downlink symbols within the RUR and symbols indicating SSB or SS/PBCH block are first removed from a range of the RUR 300. Then, the RUR 300 can be divided in the time domain (e.g., based on the time-domain granularity parameter timeGranularityforCI) to determine the time-domain portions. The time-frequency resource sub-blocks can be according determined based on the time-domain granularity parameter and the indication overhead parameter. The symbols can be configured as semi-static downlink symbols via information element in a parameter tdd-UL-DL-ConfigurationCommon.

Some embodiments of the present disclosure relate to configuring RURs and indicating cancelation of uplink transmissions on uplink transmission resources. As described, in some embodiments, the network side (e.g., the base station 104) indicates an RUR (e.g., the RUR 202 or 300). The RUR corresponds to an UL CI (e.g., the UL CI 201). The UL CI 201 indicates or otherwise identifies cancelation of uplink transmission of an uplink service (e.g., the first uplink service) carried on an uplink resource (e.g., the PUSCH 134) within the RUR corresponding to the UL CI 201. One or more UEs (e.g., the UE 102) can receive the UL CI 201. The one or more UEs can respectively determine whether uplink transmission within the RUR is canceled, based on the UL CI.

The time-frequency location configuration information (e.g., configuration parameters) of the RUR includes at least one of a time-domain starting point of the RUR, a time-domain duration of the RUR, and a frequency-domain range of the RUR.

With regard to the time-domain starting point of the RUR, the RUR starts a time interval $T_{proc,2}$ after an ending symbol of the detected UL CI, e.g., after an ending symbol of Physical downlink Control Channel (PDCCH) Control Resource Set (CORESET) which carries the UL CI. That is, a first symbol that is $T_{proc,2}$ after the ending symbol of the detected UL CI is the start symbol of the RUR. $T_{proc,2}$ corresponds to PUSCH processing capability 2. $T_{proc,2}$ depends on subcarrier spacing (SCS). For example, for a SCS of 15 kHz, $T_{proc,2}$ is equal to 5 symbols at 15 kHz. For a SCS of 30 kHz, $T_{proc,2}$ is equal to 5.5 symbols at 30 kHz, and so on.

In one scenario, different UEs (having different SCSs) can detect the same UL CI and determine the time-domain starting point of the RUR corresponding to the UL CI. In this scenario, the different UEs need to determine the time-domain starting point of the RUR using the same SCS in order to agree on the same time-domain starting point of the RUR. The SCS can be determined using one of the various methods to assure that different UEs detecting the same UL CI can determine the same time-domain starting point of the RUR.

In a first method, the SCS used in determining the time-domain starting point of the RUR (referred to as a reference SCS) is the lowest SCS in the SCS list (e.g., scs-SpecificCarrierList) in the uplink carrier frequency information. In some embodiments, the network side configures uplink carrier frequency information (such as but not limited to, the information element FrequencyInfoUL) and transmits the uplink carrier frequency information in system information such as but not limited to, system information block 1 (SIB1). The uplink carrier frequency information includes a SCS list (e.g., scs-SpecificCarrierList) of all SCSs used in the uplink carrier. A UE can use the a SCS list to configure distribution of usable RB for each SCS within the carrier.

Figure 4:
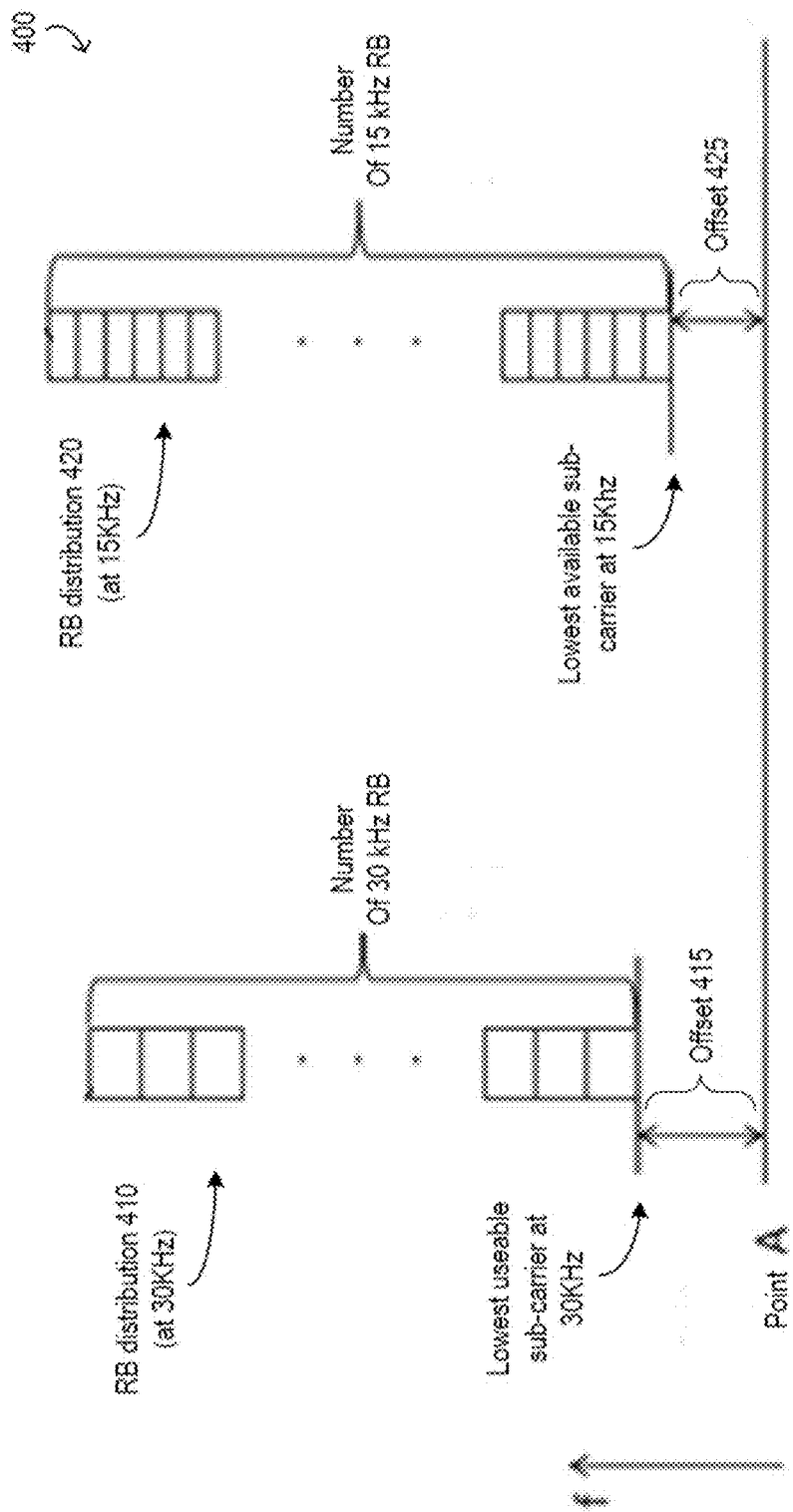
FIG. 4 is a schematic diagram illustrating examples of reference block (RB) distribution, in accordance with some embodiments of the present disclosure.

For each SCS in the SCS list of the uplink carrier frequency information, an offset (configured by a parameter offsetToCarrier) between the lowest usable subcarrier of the SCS and point A, as well as a number of RBs of the SCS (configured by a parameter carrierBandwidth) are configured or determined accordingly. FIG. 4 is a schematic diagram illustrating examples of RB distributions 400, in accordance with some embodiments of the present disclosure. Referring to FIGS. 1-4, the SCS list includes SCSs of 30 kHz and 15 kHz. The RB distributions 400 includes RB distributions 410 and 420. RB distribution 410 is the distribution of usable RBs for the SCS of 30 kHz. RB distribution 420 is the distribution of usable RBs for the SCS of 15 kHz. Point A refers to a common starting point of the common RB (CRB) of all SCSs of the carrier. That is, subcarrier 0 of CRB0 of all SCS within the carrier is aligned with point A. For each SCS of 30 kHz or 15 kHz in the SCS list, an offset (e.g., an offset 415 or 425, respectively) between the lowest usable subcarrier of each SCS of 30 kHz or 15 kHz and point A is configured. In addition, for each SCS of 30 kHz or 15 kHz, a number of RBs of the SCS (e.g., a number of 30 kHz RBs or a number of 15 kHz RBs, respectively) is configured.

In some examples, in response to a UE detecting the UL CI, the UE can determine the time-domain starting point of the RUR corresponding to the UL CI by determining $T_{proc,2}$ based on a reference SCS, where the reference SCS is the lowest SCS in the SCS list (e.g., scs-SpecificCarrierList) in the UL carrier frequency information. As shown in FIG. 4, the lowest SCS in the SCS list is the SCS of 15 kHz, and therefore, the reference SCS is the SCS of 15 kHz.

In a second method, the reference SCS is the largest SCS in the SCS list (e.g., the scs-SpecificCarrierList) in the uplink carrier frequency information. As shown in FIG. 4, the largest SCS in the SCS list is the SCS of 30 kHz, and therefore, the reference SCS is the SCS of 30 kHz.

In a third method, the reference SCS is a SCS in the SCS list that is closest to the SCS of the UL CI. In the example in which the SCS list of uplink carrier frequency information includes SCSs of 15 kHz and 60 kHz, and the SCS of the UL CI 201 is 30 kHz, given that 15 kHz is closer to 30 kHz, the SCS of 15 kHz is determined to be the reference SCS.

In a fourth method, the reference SCS is a lower one of a SCS of the UL CI 201 and a lowest SCS of a plurality of SCSs in the SCS list of the uplink carrier frequency information. In the example in which the SCS of the UL CI 201 is 15 kHz, and the SCSs in the SCS list are 30 kHz and 60 kHz, the reference SCS is the SCS of the UL CI 201, which is at 15 kHz.

With regard to the time-domain duration of the RUR, the base station can configure a number of symbols corresponding to the time-domain duration of the RUR via radio resource control (RRC) layer parameters (e.g., those parameters starting with "+–"). Similar to the time-domain starting point, the time-domain duration of the RUR depends on SCS. Different UEs need to determine the time-domain duration of the RUR using the same SCS in order to agree on the same time-domain duration of the RUR. The reference SCS can be determined using one of the various methods applicable to determining the SCS for the time-domain starting point to assure that different UEs detecting the same UL CI can determine the same time-domain duration of the RUR.

That is, in the first method, the reference SCS used in determining the time-domain duration of the RUR is the lowest SCS in the SCS list (e.g., scs-SpecificCarrierList) in the uplink carrier frequency information. In the second method, the reference SCS used in determining the time-domain duration of the RUR is the largest SCS in the SCS list (e.g., the scs-SpecificCarrierList) in the uplink carrier frequency information. In the third method, the reference SCS used in determining the time-domain duration of the RUR is a SCS in the SCS list that is closest to the SCS of the UL CI. In the fourth method, the reference SCS is the lower one of the SCS of the UL CI and the lowest SCS in the SCS list of the uplink carrier frequency information.

With regard to the frequency-domain range of the RUR, the network side (including the base station 104) configures a frequency-domain starting point of the RUR and a number of RBs included in the frequency-domain range via RRC signaling (e.g., a parameter such as but not limited to, frequencyRegionforCI). For example, the frequency-domain starting point and the number of RBs can be defined as independent parameters in the RRC message, and can be indicated separately. In other examples, the frequency-domain starting point and the number of RBs can be defined as a same parameter in the RRC message, and can be indicated jointly. That is, a same parameter can indicate a combination of a frequency-domain starting point and a number of RBs of the RUR.

The frequency-domain starting point can be defined as a frequency-domain offset from a frequency-domain reference point. The frequency-domain reference point can defined as the lowest usable subcarrier of a reference SCS. The RB number can also be determined based on the reference SCS. The reference SCS can be determined using one of the various methods applicable to determining the SCS for the time-domain starting point and the time-domain duration to assure that different UEs detecting the same UL CI can determine the same frequency-domain starting point and number of RBs of the RUR.

That is, in the first method, the reference SCS used in determining the frequency-domain starting point (e.g., the frequency-domain reference point) and the number of RBs of the RUR is the lowest SCS in the SCS list (e.g., scs-SpecificCarrierList) in the uplink carrier frequency information. In the second method, the reference SCS used in determining the frequency-domain starting point (e.g., the frequency-domain reference point) and the number of RBs of the RUR is the largest SCS in the SCS list (e.g., the scs-SpecificCarrierList) in the uplink carrier frequency information. In the third method, the reference SCS used in determining the frequency-domain starting point (e.g., the frequency-domain reference point) and the number of RBs of the RUR is a SCS in the SCS list that is closest to the SCS of the UL CI. In the fourth method, the reference SCS is the lower one of the SCS of the UL CI and the lowest SCS in the SCS list of the uplink carrier frequency information.

As described, the time-frequency location configuration information (e.g., configuration parameters) of the RUR can be configured by the base station and determined by the UE based on the reference SCS according to the described methods.

In some embodiments, the reference SCS can be determined based on whether the SCS list in the uplink carrier frequency information includes the SCS of the UL CI. For example, in response to determining that the SCS list (e.g., scs-SpecificCarrierList) in the uplink carrier frequency information includes the SCS of the UL CI, the reference SCS is set to be the SCS of the UL CI. On the other hand, in response to determining that the SCS list in the uplink carrier frequency information does not include the SCS of the UL CI, the reference SCS is determined using one of the various methods described. That is, in the first method, the reference SCS is the lowest SCS in the SCS list in the uplink carrier frequency information. In the second method, the reference SCS is the largest SCS in the SCS list in the uplink carrier frequency information. In the third method, the reference SCS is a SCS in the SCS list that is closest to the SCS of the UL CI. In the fourth method, the reference SCS is the lower one of the SCS of the UL CI and the lowest SCS in the SCS list of the uplink carrier frequency information.

In some embodiments, the reference SCS is determined to be the SCS of the UL CI. For configuring the SCS of the UL CI, only one of the SCSs in the SCS list (scs-SpecificCarrierList) in the uplink carrier frequency information can be configured by the base station as the SCS of the UL CI. That is, the UE expects that the SCS of the UL CI is in the SCS list. Accordingly, the UE can select, as the reference SCS, the SCS of the UL CI from the SCS list.

As described, the frequency-domain starting point of the frequency-domain range of the RUR can be defined as the frequency-domain offset from the frequency-domain reference point, the frequency-domain reference point being defined as the lowest usable subcarrier of the reference SCS. The RB number can be determined based on the reference SCS. In some embodiments, the SCS of the UL CI is determined to be the reference SCS. In response to determining that the SCS list (e.g., scs-SpecificCarrierList) of the uplink carrier frequency information does not include the SCS of the UL CI, the frequency-domain reference point is determined based on the uplink carrier point A and downlink carrier frequency information.

Figure 5:
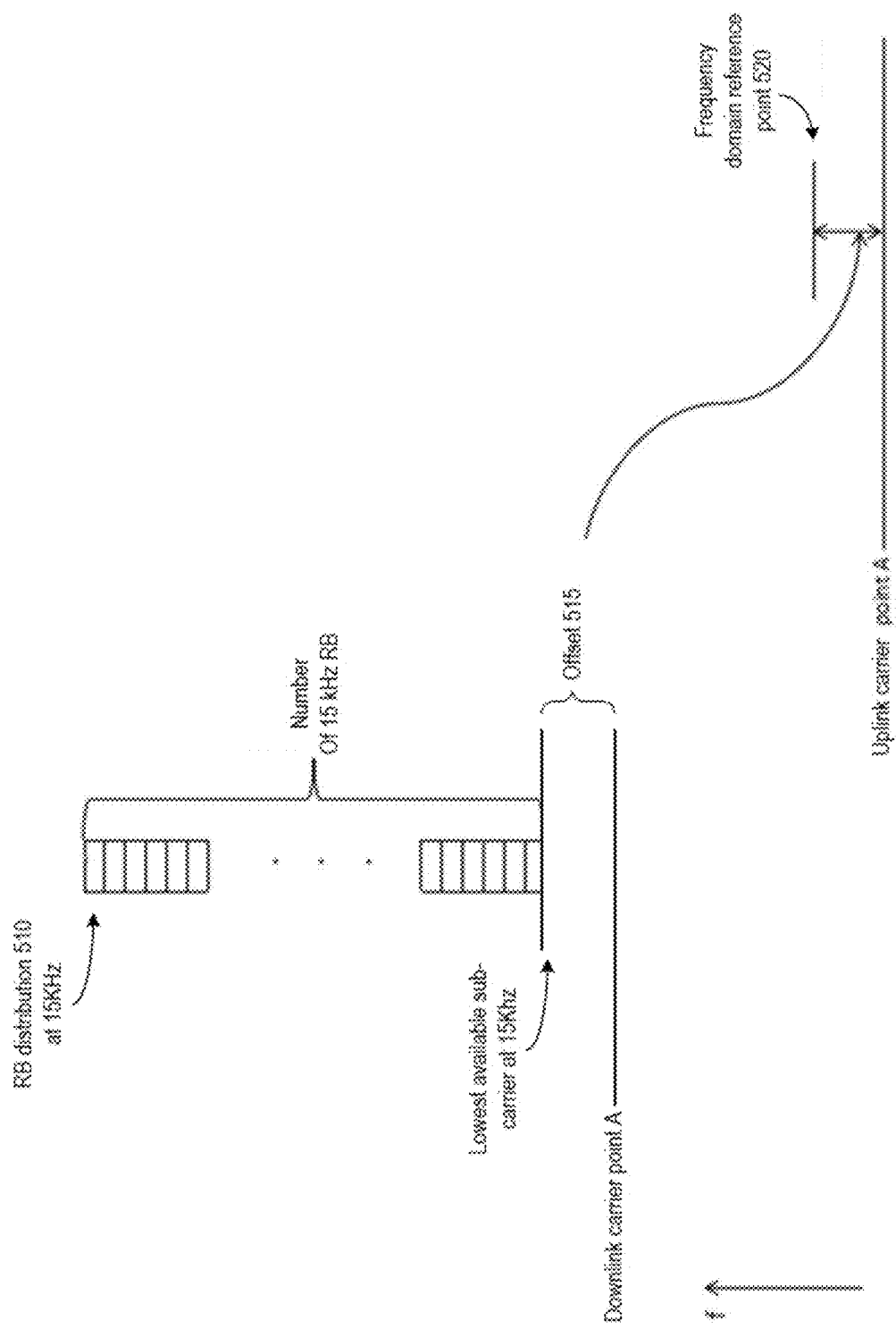
FIG. 5 is a schematic diagram illustrating examples of RB distribution and a frequency domain reference point, in accordance with some embodiments of the present disclosure.

In some examples, the position of the lowest usable subcarrier of the SCS (e.g., 15 kHz) of the UL CI is indicated using a parameter offsetToCarrier in a SCS list in the downlink carrier frequency information. FIG. 5 is a schematic diagram illustrating examples of RB distribution 510 and a frequency domain reference point 520, in accordance with some embodiments of the present disclosure. Referring to FIGS. 1-5, the RB distribution 510 is the distribution of usable RBs for the SCS of 15 kHz for UL CI. The RB distribution 510, including the lowest usable subcarrier at 15 kHz for UL CI, is indicated by the parameter offsetToCarrier in a SCS list in the downlink carrier frequency information. Downlink carrier point A refers to a common starting point of the common RB (CRB) of all SCSs of the downlink carrier at 15 kHz. That is, subcarrier 0 of CRB0 of all SCS within the downlink carrier is aligned with point A. An offset 515 between the lowest usable subcarrier at SCS for the UL CI (e.g., 15 kHz) and point A is configured. In addition, a number of RBs of 15 kHz RBs for the UL CI is configured and indicated using the parameter offsetToCarrier in a SCS list in the downlink carrier frequency information. In some embodiments, the frequency domain reference point 520 for uplink is the point A of the uplink carrier plus (increase in frequency by) the offset 515. Accordingly, the frequency-domain range of the RUR is defined based on the frequency-domain reference point 520 shown in FIG. 5, and the frequency-domain offset 515. The frequency-domain offset 515 and the number of RBs indicated by infrequencyRegionforCI.

Figure 6:
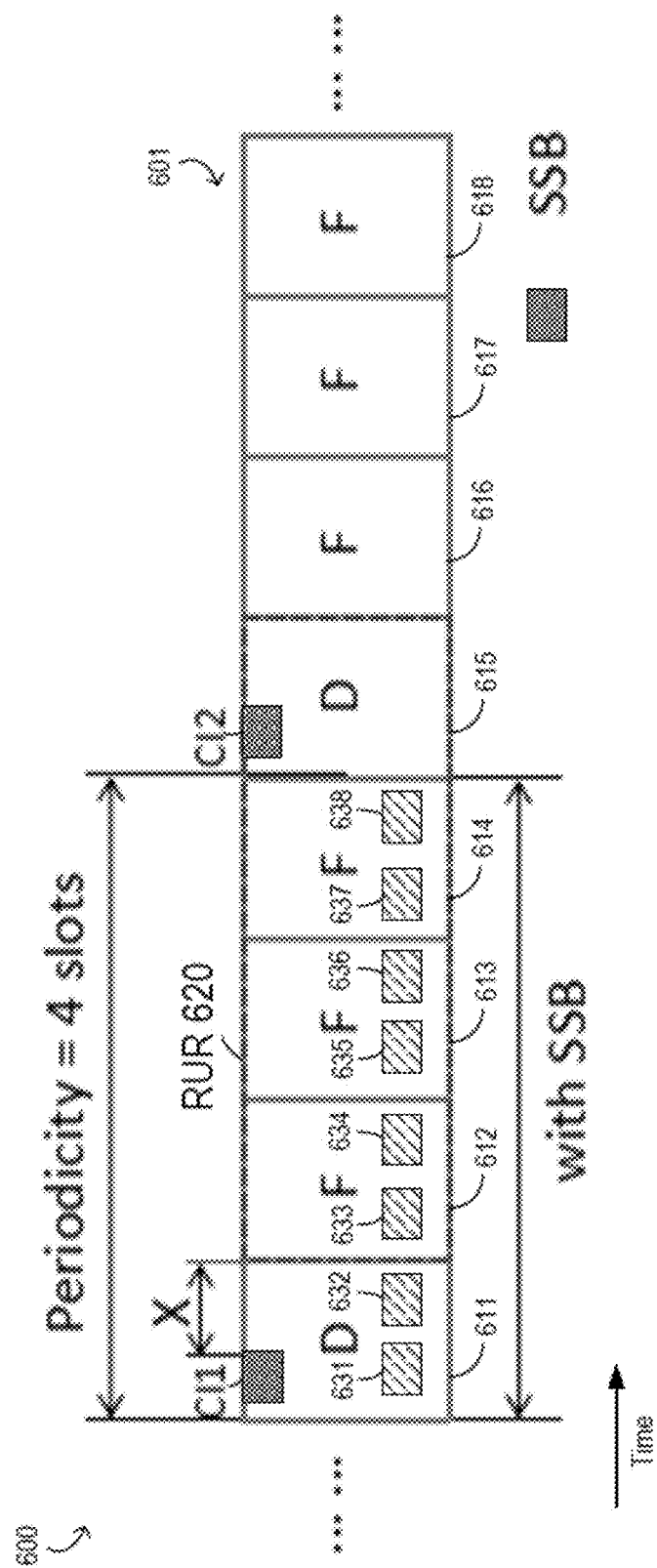
FIG. 6 is a schematic diagram illustrating a method for indicating preemption of uplink transmission resources within a RUR, in accordance with some embodiments of the present disclosure.

FIG. 6 is a schematic diagram illustrating a method 600 for indicating preemption of uplink transmission resources within a RUR 620, in accordance with some embodiments of the present disclosure. Referring to FIGS. 1-6, a base station can configure a slot format 601 via suitable RRC signaling (e.g., TDD-UL-DL-ConfigCommon). As shown, a portion of the slot format 201 includes at least eight slots 611-618. The dimension or axis of FIG. 6 that is perpendicular to the time domain axis represents frequency such as but not limited to, a bandwidth, an active BWP, and so on. The resource types of the slots 611-618 are configured as "DFFFDFFF," where "D" denotes downlink slots 611 and 615, and "F" denotes flexible slots 612-614 and 616-618.

The base station configures the RUR 620 with configuration parameters, including time-domain duration of 56 symbols, time-domain granularity (G) of 28 symbols, and indication overhead N of 112 bits. For example, the time-domain duration can be configured by the parameter timedurationforCI. Time-domain granularity can be configured by the parameter timeGranularityforCI. The indication overhead N can be configured by the parameter CI-PayloadSize.

The RUR 620 contains four slots, including three flexible slots and a semi-static downlink slot. The semi-static downlink slot includes 14 symbols. In addition, the RUR 620 contains six SSBs 633-638. Each of the SSBs 631-638 occupies 4 consecutive symbols. The SSBs 633-638 have a total of 24 symbols, assuming that all six of the SSBs 633-638 in the RUR 620 are actually transmitted. After subtracting the semi-static downlink symbols (14 symbols) and SSB symbols (24 symbols) from the time-domain duration (56 symbols) configured in timedurationforCI, the remaining 18 symbols (referred to as T) are the symbols that can correspond to a UL CI.

T can be divided according to configured G. The first x time-domain portions contain $\lfloor T/G \rfloor$ symbols, where:

$$x = G - T + \lfloor T/G \rfloor \cdot G \qquad (1).$$

The remaining $\lfloor T/G \rfloor$ time-domain portions contain $\lceil T/G \rceil$ symbols.

In response to determining that after the downlink symbols and SSB symbols are removed from the time-domain duration, the number of remaining symbols T in the RUR 620 is less than the configured number of time-domain divisions, the first 10 time-domain portions contain 0 symbols, and the last 18 time-domain portions will contain 1 symbol.

Furthermore, regardless of whether a divided time-domain portion actually contains any symbol, the indication overhead N=112 bits is equally divided into 28 time-domain portions. Each time-domain portion occupies 4 bits. That is, the frequency-domain indication granularity is ¼. As such, the first 10 time-domain portions still occupies 40 bits, although the first 10 time-domain portions do not actually correspond to any uplink transmission resources. Therefore, the 40 bits are wasted, and indication efficiency is low.

To improve efficiency, the time-domain portions of the RUR 620 can be divided based on a smaller one of G and T. For example, a parameter M can be defined as:

$$M = \min\{G, T\} \qquad (2).$$

where the RUR 620 has actually been divided in the time domain into M time-domain portions. The first x time-domain portions contain $\lfloor T/M \rfloor$ symbols, where:

$$x = M - T + \lfloor T/M \rfloor \cdot M \qquad (3).$$

The remaining $T - \lfloor T/M \rfloor \cdot M$ time-domain portions contain $\lceil T/M \rceil$ symbols.

The RUR 620 is actually divided into 18 time-domain portions, each time-domain portion contains 1 symbol. The frequency-domain indication granularity of each time-domain portion is:

$$\frac{1}{\lfloor T/M \rfloor} = \frac{1}{\lfloor 112/18 \rfloor} = \frac{1}{6}. \qquad (4)$$

In this manner, in the indication overhead N of 112 bits, only 4 bits (e.g., 112−6·18=4) are invalid. Accordingly, each time-domain portion of the RUR 620 can be divided into a same number of frequency-domain portions. In the example in which the indication overhead N is not an integer multiple of the number of actual time-domain portions, some bits may be wasted.

In some embodiments, different numbers of bits are allocate for different time-domain portions to efficiently utilize the indicator bits. The total indication bits can be allocated to each time-domain portion according to one of allocation methods.

In a first allocation method, for the first $M - N + \lfloor N/M \rfloor \cdot M$ time-domain portions of the M time-domain portions, $\lfloor N/M \rfloor$ bits are allocate. For the remaining $N - \lfloor N/M \rfloor \cdot M$ time-domain portions, $\lceil N/M \rceil$ bits are allocated. Correspondingly, the first $M - N + \lfloor N/M \rfloor \cdot M$ time-domain portions is divided into $\lfloor N/M \rfloor$ frequency-domain portions in the frequency domain, and the remaining $N - \lfloor N/M \rfloor \cdot M$ time-domain portions are divided into $\lceil N/M \rceil$ frequency-domain portions in the frequency domain.

In a second allocation method, for the first $N - \lfloor N/M \rfloor \cdot M$ time-domain portions of the M time-domain portions, $\lfloor N/M \rfloor$ bits are allocate. For the remaining $M - N + \lfloor N/M \rfloor \cdot M$ time-domain portions, $\lceil N/M \rceil$ bits are allocated. Correspondingly, the first $N - \lfloor N/M \rfloor \cdot M$ time-domain portions is divided into $\lceil N/M \rceil$ frequency-domain portions in the frequency domain, and the remaining $M - N + \lfloor N/M \rfloor \cdot M$ time-domain portions are divided into $\lfloor N/M \rfloor$ frequency-domain portions in the frequency domain.

As described, the base station configures the RUR 620 with configuration parameters, including time-domain duration of 56 symbols, time-domain granularity (G) of 28 symbols, and indication overhead N of 112 bits. After subtracting the semi-static downlink symbols (14 symbols) and SSB symbols (24 symbols) from the time-domain duration (56 symbols) configured in timedurationforCI, the remaining 18 symbols (referred to as T) are the symbols that can correspond to a UL CI.

In response to determining that T<G, the base station and UE selects a time-domain granularity value from a time-domain granularity set as the actual time-domain granularity G'. Out of time-domain granularity values in the time-domain granularity set that are less than T, the selected time-domain granularity value is closest to G (as indicated in timeGranularityforCI).

In the example in which the timeGranularityforCI value set includes {1,2,4,7,14,28}, and G is configured to be 28 (e.g., G=28), T is less than G (e.g., T<G). In this example, the actual time-domain granularity G' is selected to be 14, given that 14 is closest to G that is less than T. Accordingly G'=14. The RUR 620 can be actually divided into 14 time-domain portions, where the first 10 (e.g., G−T+⌊T/G'⌋·G') time-domain portions contain 1 (e.g., ⌊T/G'⌋) symbols, and the remaining 4 (e.g., T−⌊T/G'⌋·G') time-domain portions contain 2 (e.g., ⌈T/G'⌉) symbols. The frequency-domain indication granularity is $$\frac{1}{\lfloor 112/14 \rfloor} = \frac{1}{8}.$$

Thus, no bits are wasted.

In response to determining that T≥G, the base station and UE selects G as the actual time-domain granularity G'. The first G−T+⌊T/G⌋·G time-domain portions contain ⌊T/G⌋ symbols, and the remaining T−⌊T/G⌋·G time-domain portions contain ⌈T/G⌉ symbols.

In some embodiments, there is no restriction on the configured time-domain granularity parameter (e.g., configured by timeGranularityforCI). In the examples in which the RUR includes symbols occupied by the SSB, the number of remaining symbols T in the RUR may be smaller than the configured time-domain granularity parameter. If the time-domain portions are divided according to the configured time-domain granularity, some time-domain portions do not contain any symbols. To avoid this situation, in some embodiments, the value of the configured time-domain granularity parameter can be limited during configuration. For example, the configured time-domain granularity parameter G cannot be greater than the number of remaining symbols T In other words, when the network side configures the time-domain granularity parameter G, the number of remaining symbols T in the RUR are considered to ensure that the configured time-domain granularity parameter G is less than or equal to the number of remaining symbols T. In this case, the configured time-domain granularity parameter G can be used as the actual time domain granularity G'.

Figures 7A, 7B:
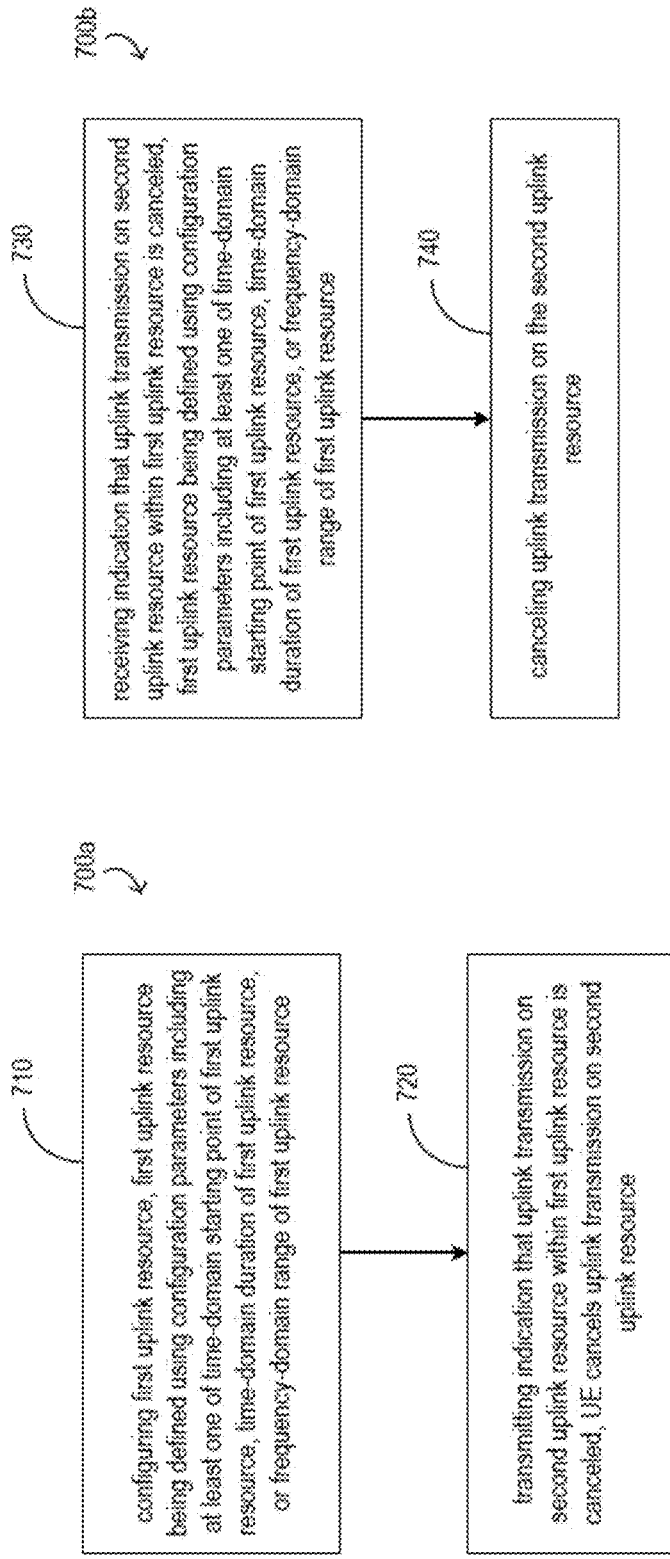
FIG. 7A is a schematic diagram illustrating a method for indicating preemption of uplink transmission resources within a RUR, in accordance with some embodiments of the present disclosure.
FIG. 7B is a schematic diagram illustrating a method for indicating preemption of uplink transmission resources within a RUR, in accordance with some embodiments of the present disclosure.

FIG. 7A is a schematic diagram illustrating a method 700a for indicating preemption of uplink transmission resources within a RUR, in accordance with some embodiments. Referring to FIGS. 1-5 and 7A, the method 700a is performed by a base station.

At 710, the base station configures a first uplink resource. The first uplink resource is defined using configuration parameters including at least one of a time-domain starting point of the first uplink resource, a time-domain duration of the first uplink resource, or a frequency-domain range of the first uplink resource. The first uplink resource is a RUR. The second uplink resource is an uplink resource (e.g., the PUSCH 134) within the RUR, where transmission of an uplink service carried on the uplink resource is to be canceled.

The configuration parameters of the first uplink resource is determined based on a reference SCS. In some embodiments, the reference SCS is a lowest SCS of a plurality of SCSs in a SCS list in uplink carrier frequency information. In some embodiments, the reference SCS is a largest SCS of a plurality of SCSs in a SCS list in uplink carrier frequency information. In some embodiments, the reference SCS is a SCS of a plurality of SCSs in a SCS list in uplink carrier frequency information that is closest to a SCS of the indication. In some embodiments, the reference SCS is a lower one of a SCS of the indication and a lowest SCS of a plurality of SCSs in a SCS list in uplink carrier frequency information.

In some embodiments, in response to determining that a SCS list in uplink carrier frequency information includes a SCS of the indication, the reference SCS is the SCS of the indication. In some embodiments, in response to determining that the SCS list in the uplink carrier frequency information does not include the SCS of the indication, the reference SCS is one of: a lowest SCS of a plurality of SCSs in the SCS list, a largest SCS of the plurality of SCSs in the SCS list, or a SCS of the plurality of SCSs in the SCS list that is closest to the SCS of the indication.

In some embodiments, the reference SCS is an SCS of the indication, and the SCS of the indication is one of a plurality of SCSs in a SCS list in uplink carrier frequency information.

In some embodiments, the frequency-domain range of the first uplink resource is defined by a frequency-domain starting point and a number of RBs. The frequency-domain starting point is determined based on a frequency-domain offset from a frequency-domain reference point. The frequency-domain reference point is a lowest usable subcarrier of the reference SCS. The number of RBs is determined based on the reference SCS. In response to determining that a SCS list of uplink carrier frequency information does not include a SCS of the indication, the frequency-domain reference point is determined based on uplink carrier point A and downlink carrier frequency information.

At 720, the base station transmits to a UE, an indication that uplink transmission on a second uplink resource within the first uplink resource is canceled. The indication is a UL CI. The UE cancels the uplink transmission on the second uplink resource.

FIG. 7B is a schematic diagram illustrating a method 700b for indicating preemption of uplink transmission resources within a RUR, in accordance with some embodiments. Referring to FIGS. 1-5, 7A, and 7B, the method 700b is performed by a UE.

At 730, the UE receives from the base station an indication that uplink transmission on a second uplink resource within a first uplink resource is canceled. The first uplink resource being defined using configuration parameters including at least one of a time-domain starting point of the first uplink resource, a time-domain duration of the first uplink resource, or a frequency-domain range of the first uplink resource. At 740, the UE cancels the uplink transmission on the second uplink resource.

FIG. 8A is a schematic diagram illustrating a method 800a for indicating preemption of uplink transmission resources within a RUR, in accordance with some embodiments. Referring to FIGS. 1-3, 6, and 8A, the method 800a is performed by a UE.

At 810, the UE receives from a base station, a network-side indicated time-domain granularity (G). At 820, the UE determines a number of symbols remaining (T) in a first uplink resource. The first uplink resource used to indicate cancelation of uplink transmission on a second uplink resource. The first uplink resource is a RUR. The second uplink resource is an uplink resource (e.g., the PUSCH 134) within the RUR, where transmission of an uplink service carried on the uplink resource is to be canceled. At 830, the UE determines a number of time-domain portions of the first uplink transmission resource based on T and G.

In some embodiments, M is defined as M=min{G,T}. The first uplink resource is actually divided into M time-domain portions. First x time-domain portions contain $\lfloor T/M \rfloor$ symbols, where $x=M-T+\lfloor T/M \rfloor \cdot M$. Remaining $T-\lfloor T/M \rfloor \cdot M$ time-domain portions contain $\lceil T/M \rceil$ symbols.

In some embodiments, in response to determining that T is less than G, a time-domain granularity value is selected from a time-domain granularity set as an actual time-domain granularity G'. The selected actual time-domain granularity G' is less than T and closest to G. First $G'-T+\lfloor T/G' \rfloor \cdot G'$ time-domain portions of the first uplink resource includes $\lfloor T/G' \rfloor$ symbols. Remaining $T-\lfloor T/G' \rfloor \cdot G'$ time-domain portions of the first uplink resource contain $\lceil T/G' \rceil$ symbols.

In some embodiments, in response to determining that T is greater or equal to G, G is determined to be an actual time-domain granularity. First $G-T+\lfloor T/G \rfloor \cdot G$ time-domain portions of the first uplink resource includes $\lfloor T/G \rfloor$ symbols. Remaining $T-\lfloor T/G \rfloor \cdot G$ time-domain portions of the first uplink resource contain $\lceil T/G \rceil$ symbols.

In some embodiments, G is less or equal to T G is determined based on T.

FIG. 8B is a schematic diagram illustrating a method 800b for indicating preemption of uplink transmission resources within a RUR, in accordance with some embodiments. Referring to FIGS. 1-3, 6, 8A, and 8B, the method 800b is performed by a base station.

At 840, the base station configures a network-side indicated time-domain granularity (G). At 850, the base station determines a number of symbols remaining (T) in a first uplink resource. The first uplink resource used to indicate cancelation of uplink transmission on a second uplink resource. An actual number of time-domain portions of the first uplink transmission resource is determined based on T and G.

Figure 9B:
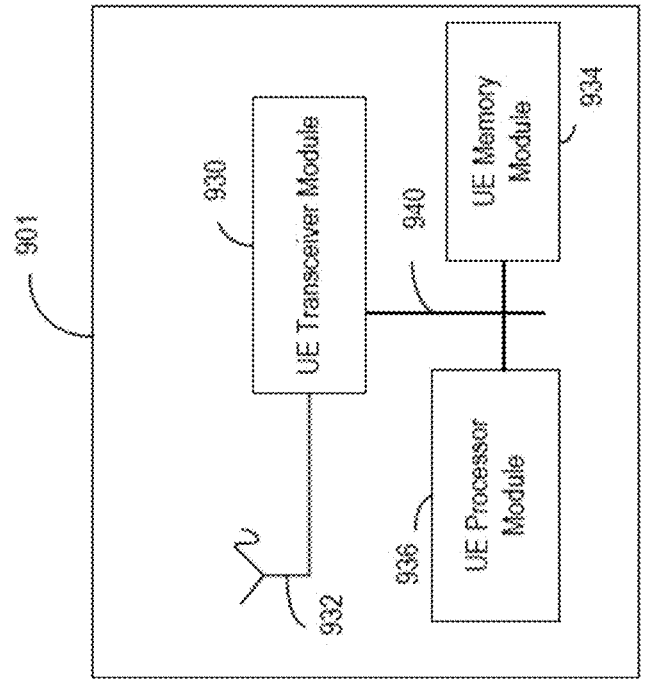
FIG. 9B illustrates a block diagram of an example UE, in accordance with some embodiments of the present disclosure.
Figure 9A:
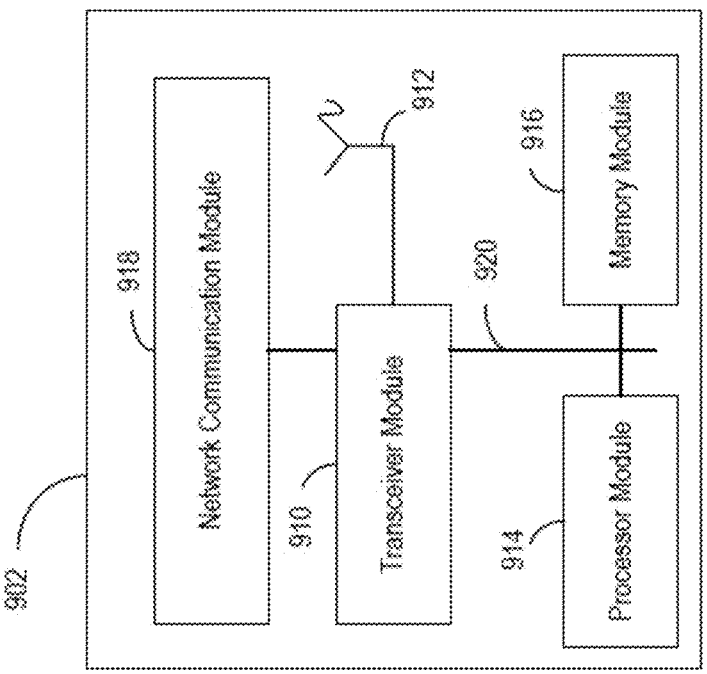
FIG. 9A illustrates a block diagram of an example base station, in accordance with some embodiments of the present disclosure.

FIG. 9A illustrates a block diagram of an example base station 902, in accordance with some embodiments of the present disclosure. FIG. 9B illustrates a block diagram of an example UE 901, in accordance with some embodiments of the present disclosure. Referring to FIGS. 1-9B, the UE 901 (e.g., a wireless communication device, a terminal, a mobile device, a mobile user, and so on) is an example implementation of the UEs described herein, and the base station 902 is an example implementation of the base station described herein.

The base station 902 and the UE 901 can include components and elements configured to support known or conventional operating features that need not be described in detail herein. In one illustrative embodiment, the base station 902 and the UE 901 can be used to communicate (e.g., transmit and receive) data symbols in a wireless communication environment, as described above. For instance, the base station 902 can be a base station (e.g., gNB, eNB, and so on), a node, a server, or any suitable computing device used to implement various network functions.

The base station 902 includes a transceiver module 910, an antenna 912, a processor module 914, a memory module 916, and a network communication module 918. The module 910, 912, 914, 916, and 918 are operatively coupled to and interconnected with one another via a data communication bus 920. The UE 901 includes a UE transceiver module 930, a UE antenna 932, a UE memory module 934, and a UE processor module 936. The modules 930, 932, 934, and 936 are operatively coupled to and interconnected with one another via a data communication bus 940. The base station 902 communicates with the UE 901 or another base station via a communication channel, which can be any wireless channel or other medium suitable for transmission of data as described herein.

As would be understood by persons of ordinary skill in the art, the base station 902 and the UE 901 can further include any number of modules other than the modules shown in FIGS. 9A and 9B. The various illustrative blocks, modules, circuits, and processing logic described in connection with the embodiments disclosed herein can be implemented in hardware, computer-readable software, firmware, or any practical combination thereof. To illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. The embodiments described herein can be implemented in a suitable manner for each particular application, but any implementation decisions should not be interpreted as limiting the scope of the present disclosure.

In accordance with some embodiments, the UE transceiver 930 includes a radio frequency (RF) transmitter and a RF receiver each including circuitry that is coupled to the antenna 932. A duplex switch (not shown) may alternatively couple the RF transmitter or receiver to the antenna in time duplex fashion. Similarly, in accordance with some embodiments, the transceiver 910 includes an RF transmitter and a RF receiver each having circuitry that is coupled to the antenna 912 or the antenna of another base station. A duplex switch may alternatively couple the RF transmitter or receiver to the antenna 912 in time duplex fashion. The operations of the two transceiver modules 910 and 930 can be coordinated in time such that the receiver circuitry is coupled to the antenna 932 for reception of transmissions over a wireless transmission link at the same time that the transmitter is coupled to the antenna 912. In some embodiments, there is close time synchronization with a minimal guard time between changes in duplex direction.

The UE transceiver 930 and the transceiver 910 are configured to communicate via the wireless data communication link, and cooperate with a suitably configured RF antenna arrangement 912/932 that can support a particular wireless communication protocol and modulation scheme. In some illustrative embodiments, the UE transceiver 910 and the transceiver 910 are configured to support industry standards such as the Long Term Evolution (LTE) and emerging 5G standards, and the like. It is understood, however, that the present disclosure is not necessarily limited in application to a particular standard and associated protocols. Rather, the UE transceiver 930 and the base station transceiver 910 may be configured to support alternate, or additional, wireless data communication protocols, including future standards or variations thereof.

The transceiver 910 and the transceiver of another base station (such as but not limited to, the transceiver 910) are configured to communicate via a wireless data communication link, and cooperate with a suitably configured RF antenna arrangement that can support a particular wireless communication protocol and modulation scheme. In some illustrative embodiments, the transceiver 910 and the transceiver of another base station are configured to support industry standards such as the LTE and emerging 5G standards, and the like. It is understood, however, that the present disclosure is not necessarily limited in application to a particular standard and associated protocols. Rather, the transceiver 910 and the transceiver of another base station may be configured to support alternate, or additional, wireless data communication protocols, including future standards or variations thereof.

In accordance with various embodiments, the base station 902 may be a base station such as but not limited to, an eNB, a serving eNB, a target eNB, a femto station, or a pico station, for example. The base station 902 can be an RN, a regular, a DeNB, or a gNB. In some embodiments, the UE 901 may be embodied in various types of user devices such as a mobile phone, a smart phone, a personal digital assistant (PDA), tablet, laptop computer, wearable computing device, etc. The processor modules 914 and 936 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the method or algorithm disclosed herein can be embodied directly in hardware, in firmware, in a software module executed by processor modules 914 and 936, respectively, or in any practical combination thereof. The memory modules 916 and 934 may be realized as RAM memory, flash memory, ROM memory, EPROM memory, EEPROM memory, registers, a hard disk, a removable disk, a CD-ROM, or any other form of storage medium known in the art. In this regard, memory modules 916 and 934 may be coupled to the processor modules 910 and 930, respectively, such that the processors modules 910 and 930 can read information from, and write information to, memory modules 916 and 934, respectively. The memory modules 916 and 934 may also be integrated into their respective processor modules 910 and 930. In some embodiments, the memory modules 916 and 934 may each include a cache memory for storing temporary variables or other intermediate information during execution of instructions to be executed by processor modules 910 and 930, respectively. Memory modules 916 and 934 may also each include non-volatile memory for storing instructions to be executed by the processor modules 910 and 930, respectively.

The network communication module 918 generally represents the hardware, software, firmware, processing logic, and/or other components of the base station 902 that enable bi-directional communication between the transceiver 910 and other network components and communication nodes in communication with the base station 902. For example, the network communication module 918 may be configured to support internet or WiMAX traffic. In a deployment, without limitation, the network communication module 918 provides an 802.3 Ethernet interface such that the transceiver 910 can communicate with a conventional Ethernet based computer network. In this manner, the network communication module 918 may include a physical interface for connection to the computer network (e.g., Mobile Switching Center (MSC)). In some embodiments, the network communication module 918 includes a fiber transport connection configured to connect the base station 902 to a core network. The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according to embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

We claim:
1. A method, comprising:
configuring, by a base station, a first uplink resource, the first uplink resource being defined using configuration parameters comprising at least one of a time-domain starting point of the first uplink resource, a time-domain duration of the first uplink resource, or a frequency-domain range of the first uplink resource; and
transmitting, by the base station to a wireless communication device, an indication that uplink transmission on a second uplink resource within the first uplink resource is canceled, wherein the wireless communication device cancels the uplink transmission on the second uplink resource,
wherein the configuration parameters of the first uplink resource is determined based on a reference subcarrier spacing (SCS), wherein the reference SCS is an SCS of the indication, and the SCS of the indication is one of a plurality of SCSs in a SCS list in uplink carrier frequency information.
2. The method of claim 1, wherein
the first uplink resource is a reference uplink region (RUR); and
the indication is an uplink cancelation indication (UL CI).
3. The method of claim 1, wherein
the frequency-domain range of the first uplink resource is defined by a frequency-domain starting point and a number of reference blocks (RBs);
the frequency-domain starting point is determined based on a frequency-domain offset from a frequency-domain reference point;
the frequency-domain reference point is a lowest usable subcarrier of the reference SCS; and
the number of RBs is determined based on the reference SCS.
4. A base station, comprising:
at least one processor configured to:
configure a first uplink resource, the first uplink resource being defined using configuration parameters comprising at least one of a time-domain starting point of the first uplink resource, a time-domain duration of the first uplink resource, or a frequency-domain range of the first uplink resource; and
transmit, via a transmitter to a wireless communication device, an indication that uplink transmission on a second uplink resource within the first uplink resource is canceled, wherein the wireless communication device cancels the uplink transmission on the second uplink resource,
wherein the configuration parameters of the first uplink resource is determined based on a reference subcarrier spacing (SCS), wherein the reference SCS is an SCS of the indication, and the SCS of the indication is one of a plurality of SCSs in a SCS list in uplink carrier frequency information.
5. The base station of claim 4, wherein
the first uplink resource is a reference uplink region (RUR); and
the indication is an uplink cancelation indication (UL CI).

6. The base station of claim 4, wherein
the frequency-domain range of the first uplink resource is defined by a frequency-domain starting point and a number of reference blocks (RBs);
the frequency-domain starting point is determined based on a frequency-domain offset from a frequency-domain reference point;
the frequency-domain reference point is a lowest usable subcarrier of the reference SCS; and
the number of RBs is determined based on the reference SCS.

7. A method, comprising:
receiving, by a wireless communication device from a base station, an indication that uplink transmission on a second uplink resource within a first uplink resource is canceled, the first uplink resource being defined using configuration parameters comprising at least one of a time-domain starting point of the first uplink resource, a time-domain duration of the first uplink resource, or a frequency-domain range of the first uplink resource; and
canceling, by the wireless communication device, the uplink transmission on the second uplink resource,
wherein the configuration parameters of the first uplink resource is determined based on a reference subcarrier spacing (SCS), wherein the reference SCS is an SCS of the indication, and the SCS of the indication is one of a plurality of SCSs in a SCS list in uplink carrier frequency information.

8. The method of claim 7, wherein
the first uplink resource is a reference uplink region (RUR); and
the indication is an uplink cancelation indication (UL CI).

9. The method of claim 7, wherein
the frequency-domain range of the first uplink resource is defined by a frequency-domain starting point and a number of reference blocks (RBs);
the frequency-domain starting point is determined based on a frequency-domain offset from a frequency-domain reference point;
the frequency-domain reference point is a lowest usable subcarrier of the reference SCS; and
the number of RBs is determined based on the reference SCS.

10. A wireless communication device comprising:
at least one processor configured to:
receive, from a base station, an indication that uplink transmission on a second uplink resource within a first uplink resource is canceled, the first uplink resource being defined using configuration parameters comprising a frequency-domain range of the first uplink resource; and
cancel the uplink transmission on the second uplink resource
wherein the configuration parameters of the first uplink resource is determined based on a reference subcarrier spacing (SCS), wherein the reference SCS is an SCS of the indication, and the SCS of the indication is one of a plurality of SCSs in a SCS list in uplink carrier frequency information.

11. The wireless communication device of claim 10, wherein:
the first uplink resource is a reference uplink region (RUR); and
the indication is an uplink cancelation indication (UL CI).

12. The wireless communication device of claim 10, wherein:
the frequency-domain range of the first uplink resource is defined by a frequency-domain starting point and a number of reference blocks (RBs);
the frequency-domain starting point is determined based on a frequency-domain offset from a frequency-domain reference point;
the frequency-domain reference point is a lowest usable subcarrier of the reference SCS; and
the number of RBs is determined based on the reference SCS.

* * * * *